Figure 1:
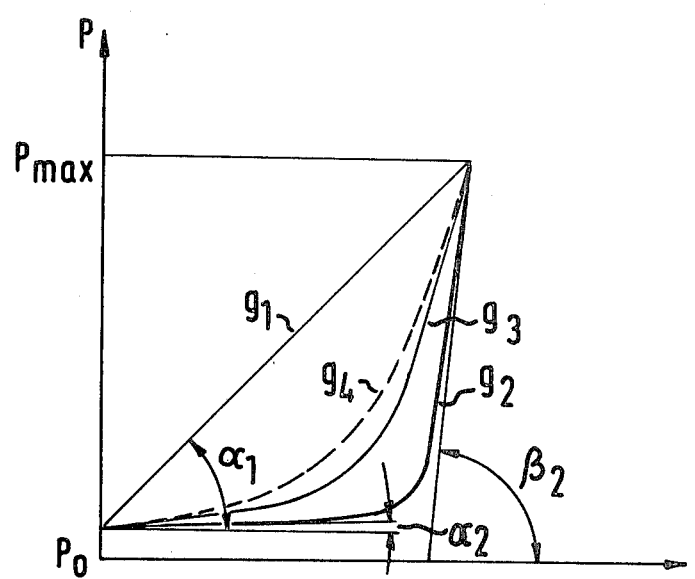
Figure 3:
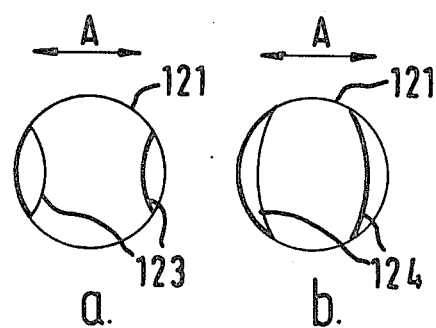

United States Patent [19]

Ivony et al.

[11] 4,143,676

[45] Mar. 13, 1979

[54] HYDRAULIC PORT CONTROL APPARATUS, E.G. FOR MOTOR VEHICLE SERVO STEERING GEAR

[76] Inventors: József Ivony, XIII. Hegedüs Gyula U 50; Imre Lendvai, XIX, Árpád U. 35; László Szücs, I. Bathyány U. 14; László Székely, I. Gyula u. 1, all of Budapest, Hungary

[21] Appl. No.: 865,512

[22] Filed: Dec. 29, 1977

Related U.S. Application Data

[63] Continuation-in-part of Ser. No. 671,297, Mar. 29, 1976, abandoned.

[51] Int. Cl.² ............................................. F16K 11/06
[52] U.S. Cl. ......................... 137/625.23; 137/625.43
[58] Field of Search ........... 137/625.4, 625.23, 625.24, 137/625.43; 91/375 R, 375 A

[56] References Cited

U.S. PATENT DOCUMENTS

| | | | |
|---|---|---|---|
| 3,291,002 | 12/1966 | Folkerts | 137/625.23 X |
| 3,773,081 | 11/1973 | Venable | 137/625.43 |

*Primary Examiner*—Alan Cohan
*Attorney, Agent, or Firm*—Warren, Chickering & Grunewald

[57] ABSTRACT

The invention concerns hydraulic control valves suitable for e.g. motor vehicle steering gear. A variety of control port configurations are formed between cooperating ribs and bores on the control piston — which may be rotary or axially displaceable — and on the control sleeve. In each case the resulting control ports are defined by circular arcs having a common chord arranged at right angles to the direction of the control displacement for example at right angles to the direction of the control displacement for example at right angles to the direction of rotation of a steering spindle.

12 Claims, 16 Drawing Figures

HYDRAULIC PORT CONTROL APPARATUS, E.G. FOR MOTOR VEHICLE SERVO STEERING GEAR

The present application is a continuation-in-part application from application Ser. No. 671,297 filed Mar. 29, 1976, now abandoned.

BACKGROUND OF THE INVENTION

The invention concerns hydraulic port control apparatus having an open centre (neutral) position and including a cylindrical control piston disposed in a control cylinder, and having a control characteristic which satisfies primarily the demands arising in servo-assisted steering gear for motor vehicles. The hydraulic port control apparatus according to the invention may equally advantageously be constructed by simple manufacturing technology in a rotary piston embodiment or an axial-displacement piston embodiment.

FIELD OF THE INVENTION

This invention concerns primarily an open-centered control gear of reciprocating action having two working spaces, for use in motor vehicle servo steering gear. In servo steering gear the magnitude of the controlling displacement is small and limited relative to the through-flow cross-section of the control port, due to the constructional form of the elements giving rise to the control signal. The normal operational condition is not one or other of the extreme positions of the piston, but the intermediate piston positions where the demands made on the operation of the device may be characterized by curves with due regard to the fact that the working piston of the servo-steering gear is in a mechanical feedback connection with the control.

DESCRIPTION OF THE PRIOR ART

One known type of hydraulic control, primarily for servo-assisted steering gear for motor vehicles, is constructed by providing both the control piston and the control sleeve or cylinder with annular grooves of varying width and of rectangular cross-section and the control movement takes place by axial movement of the control piston. The resulting control ports or orifices are portions of a cylindrical surface which, developed into a single plane, have a rectangular cross-section.

Another type of known servo control or steering gear has a rotary piston. In such apparatus there are ribs in the direction of the generatrix on the control piston while on the control sleeve or cylinder there are grooves of varying widths parallel with the ribs. The control orifices formed by the ribs and grooves also have a rectangular configuration when developed into a plane.

Another known variant has generally rectangular ribs on the piston and circular orifices on the sleeve, giving each port a boundary which is partly straight and partly circular.

The widespread use of control mechanisms having rectangular orifices, primarily the axial pistons, is due to the relative ease with which they may be manufactured to a more or less sufficient accuracy. Their disadvantage is, however, that their control characteristics are unfavourable. This is because the closure of the through-flow orifice is linearly dependent on the relative displacement, and hence in the case of pressure control with throttling, the change in pressure varies strongly non-linearly with the displacement of the control element, in contrast with the ideal of a linear characteristic of control element displacement against liquid pressure. Along the major portion of the control path (curve) the liquid pressure hardly increases at all, while in its final portion the pressure increase is sudden. Servo-assisted steering gear provided with such control mechanism is virtually insensitive over a relatively long portion of the control movement, while in its short final section it is excessively sensitive. The frequently experienced proneness to vibration of servo-assisted steering gear can be traced to this excessive sensitivity.

FIG. 1 of the accompanying drawings illustrates a number of control gear characteristics. The abscissa of the Figure shows the control element displacement X, while its ordinate shows the liquid pressure P. The ideal control characteristic is that referenced $g_1$, which is a straight line at 45° to the two axes; while the curve $g_2$ is the control characteristic of a control valve having rectangular control orifices or ports.

According to the ideal control curve the change of liquid pressure along the control path is uniform and therefore the so-called pressure sensitivity is constant along the whole length of the control path. (Graphically the pressure sensitivity is given by the tangent of the angle $\alpha$ between the control characteristic and the abscissa). It is conspicuous that the curve $g_2$ shows a pressure sensitivity widely deviating from the ideal curve. At the initial point of the curve, i.e., in the normal or basic position of the control gear the so-called fundamental pressure sensitivity, $\tan \alpha$, has a value of almost 0. In contrast, at the final point of the curve the pressure sensitivity associated with the maximum pressure, the so-called final pressure sensitivity, $\tan \beta_2$ considerably exceeds the pressure sensitivity associated with the ideal characteristic of $\tan \alpha_2 = 1$. In the comparative evaluation of control characteristics it is customary to set up a ratio of the final pressure sensitivity with the fundamental pressure sensitivity, i.e. $\tan \beta_2/\tan \alpha_1$. The smaller the value of this ratio, the more favorable the characteristic is considered to be. In the ideal characteristic, this ratio is 1.

On examining the operation of control elements provided with rectangular cross-section control orifices from the point of view of the geometry of orifice closure it is found that when the control piston is displaced uniformly, i.e. at constant velocity, the closure of the through-flow cross-sections of the control orifices is also of uniform rate. This situation applies both to axial and rotary control valves. The unfavorable control characteristic according to curve $g_2$ arises from this.

SUMMARY OF THE PRESENT INVENTION

One aim of this invention is to provide control apparatus with a characteristic more favorable than those known hitherto, approximating more closely to the ideal characteristic with a higher initial pressure sensitivity and a lower final pressure sensitivity without at the same time increasing the demands made on manufacturing technology of known control apparatus, or even reducing them. It is sought in the present invention to attain the above aim by providing control orifices or ports of predetermined geometrical configurations and appropriate disposition in the control piston and in the control sleeve in a way that enables them to be made relatively easily with the usual technology and in which the change in the area of the through-flow cross-section, i.e. the closure of the orifice, is not linear as a function of the control displacement, but is instead sudden or rapid in the beginning and subsequently is slower and hence the pressure control with throttling employed in this invention more closely approximates the linear ideal.

According therefore to the present invention there is provided hydraulic port control apparatus for approximating more closely to pressure regulation proportional to displacement, for use with hydraulic devices of the reciprocating, double-acting type such as servo-steering gear of motor-vehicles, said control apparatus comprising a control mechanism including a control sleeve and a coaxial, cylindrical control piston, a control signal-generating element connected for movement transmission to one of said control sleeves and said control piston while the other of said control sleeve and control piston being prevented from displacement in the direction of the control movement, pressure chambers, working fluid channels and working fluid inlets and outlets defined in the said apparatus and connected to the control mechanism as well as to the pressure chambers, and control ports defined between cooperating openings and projections formed on the control piston and the control sleeve, wherein the control ports are so arranged in pairs that as one is opened the other is closed and vice versa, there is an open center position in which both ports of each pair are open to the same extent, the sectional configuration of each control port in a direction perpendicular to the direction of flow through is defined by two intersecting circular arcs having a common cord of maximum length H in the said open center position, the diameter of the arcs if all the arcs are the same diameter or the smaller arc if the arcs are of different diameters is D, and $H \geq D/2$.

The element for generating the said signal may be a steering spindle or linkage.

The control mechanism may be equally advantageously constructed as an axial piston wherein the control ports are formed from cylindrical grooves on the control piston and bores in the cylindrical sleeve overlapping with the grooves; or as rotary pistons where longitudinal ribs are formed on the pistons.

A further preferred feature of the invention is that the diameter of the radial bore arranged on one of the control elements, expediently on the control sleeve, is greater than that of the opposed control element, expediently the width of the rib of the control piston, and in the open centre (neutral) position the centre point of the bore coincides with the centre line of the rib. The control valve embodied in the invention approximates the ideal control curve e.g. by having control orifices formed from bores or drillings of differing diameters.

The formation of control orifices delimited by right circular cylindrical surfaces, according to a preferred embodiment of the invention is effected by forming recesses or bores or drillings on the cooperating surfaces of the two cylindrical control elements — the control movement of which is either relative axial or angular displacement about a common axis — the recesses or bores being formed expediently along a generatrix or at right angles to the rotational axis in a common plane, the recesses and bores being expediently bounded by surfaces perpendicular to the common axis of the two control elements or being of parallel axis of their meridian plane, the said surfaces being cylindrical; the arrangement being such that a control bore on one control element is encompassed by two sections on the other control element which are radial or, viewed in parallel from the meridian plane are circular segments in section delimited by circles, circular segments or circular arcs, the configurations (bores, ribs) on the two control elements being in partial overlap and the single bore on one control element is at the bisection of the two control configurations of the other control element at the axis thereof in the neutral position.

In dependence of the variation in the ratio of the distance between the axes and the diameters of the cylindrical surfaces a plurality of different situations may be produced according to the invention.

In one case the axial distance is smaller than the sum of the diameters of the bores on two different control elements. In this case the control orifices are formed by the summation of two circular segments disposed on the two sides of a common chord and are biconvex. In this case the boundaries of the control orifices are the concave sides of the cylindrical surfaces, while in another case the axial distance of the two control formations on one control element is smaller than the diameter of the cylindrical surfaces defined by it, but smaller than the control element bounded by parts of the single cylindrical surface on the opposite control element, the outer surface of which is convex and delimits the control orifice with the formation (bore) which has a concave surface.

In a further case the axial distance is smaller than the diameter of the cylindrical surface portions divided by it but greater than the diameter of the single bore on the other control element. In this case the control orifices are formed by the difference between the two circular segments on one side of the common chord and have a convex-concave configuration. One boundary of the control orifices is the concave side of the two intersecting cylindrical surfaces and the other is a concave surface of the bore on the other control element. From the point of view of control technology it is expedient if the common chord is at most identical or smaller than the smaller diameter such that it is formed on the side nearer the control orifices of the diameter perpendicular to the direction of control displacement.

For producing such a concave-convex control orifice the invention affords a favourable technological possibility according to which a bolt having a cylindrical portion can be inserted in a radial bore in the piston and can be secured therein. The bolt has an end portion with longitudinal cylindrical surfaces which if projected would intersect each other at the end of a chord which is longer than the diameter of the cylindrical portion of the bolt, while the transverse end surface of the end portion of the bolt is a cylindrical surface corresponding in curvature with that of the end surface of the piston. Fitting the bolt into the piston ensues so that the chord is perpendicular to the direction of control movement, while the bolt end surface is disposed in the cylindrical surface of the piston, expediently by simultaneous machining. The bore cooperating therewith and disposed on the other control element is formed concentrically with the common chord mentioned above and has a smaller diameter than the said common chord and one-half of the difference at the two ends of the chord should be of sufficient magnitude for the formation of the sealing surface along the cylinder.

Figure 4:
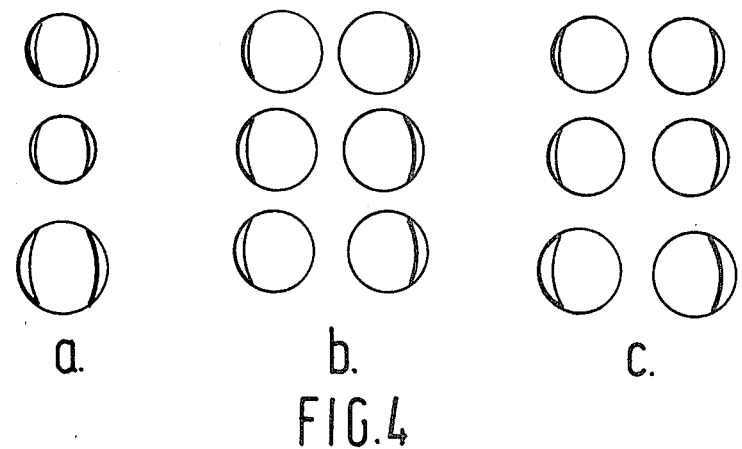
Figure 2:
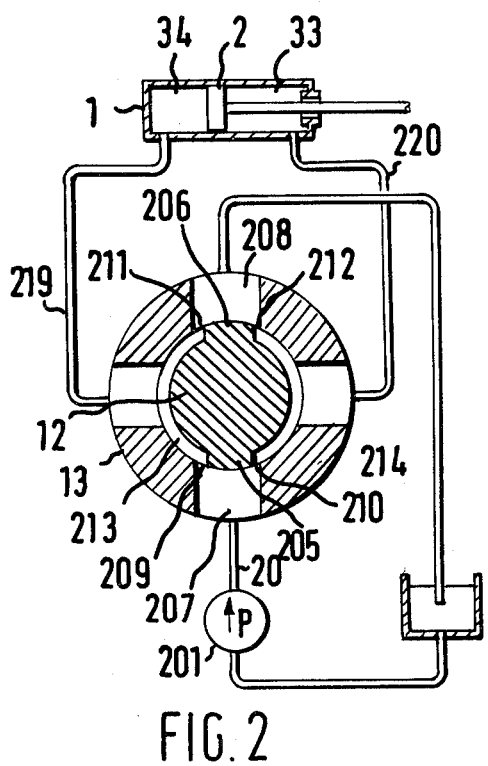
Figure 6:
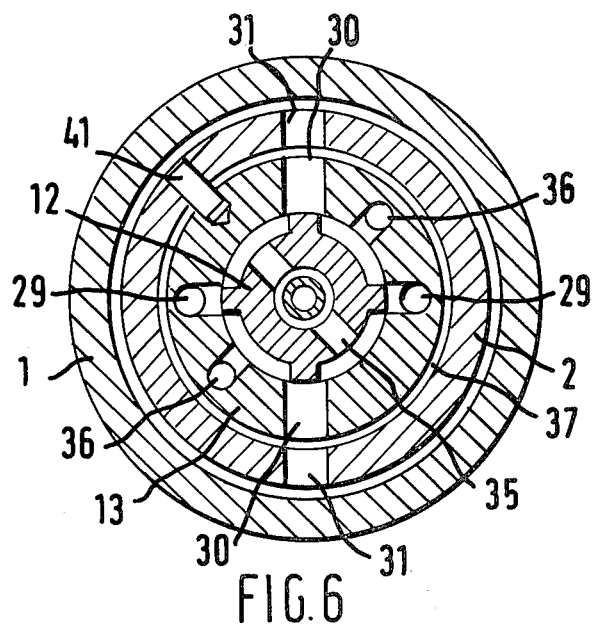
Figure 7:
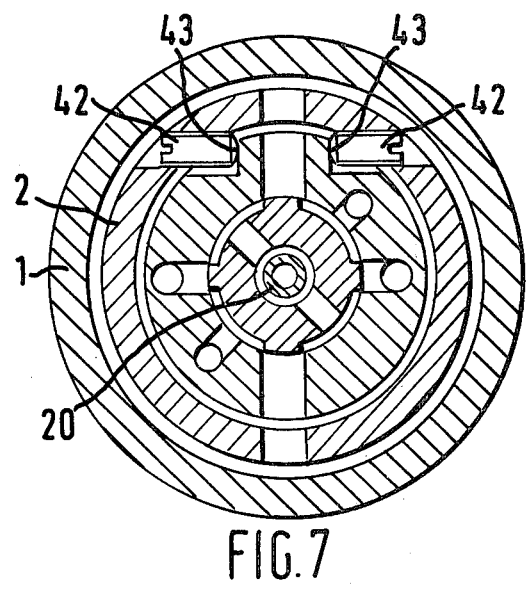
Figure 5:
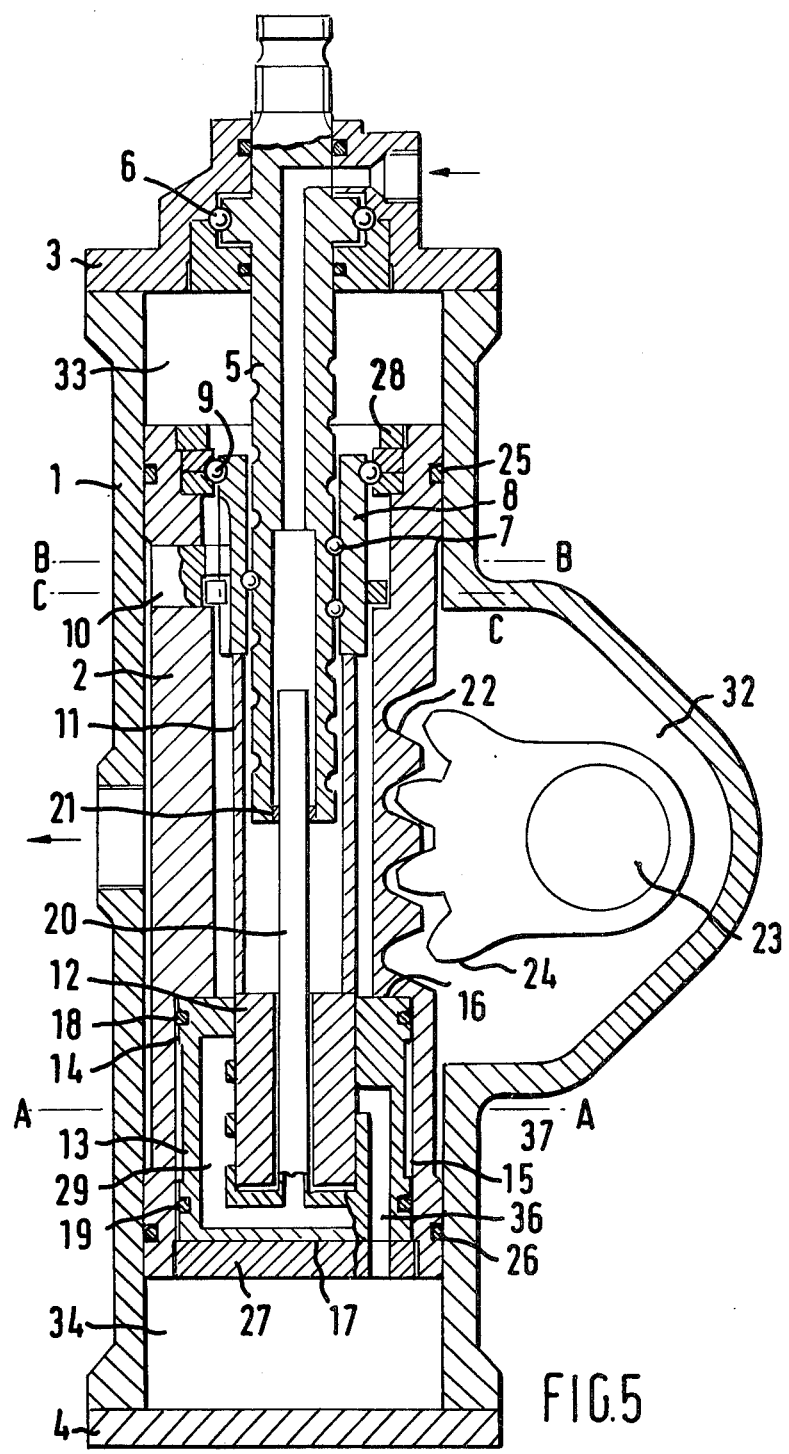
Figure 8:
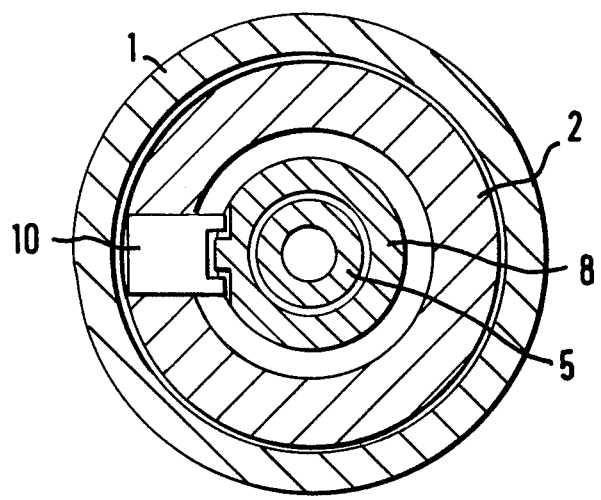
Figure 9:
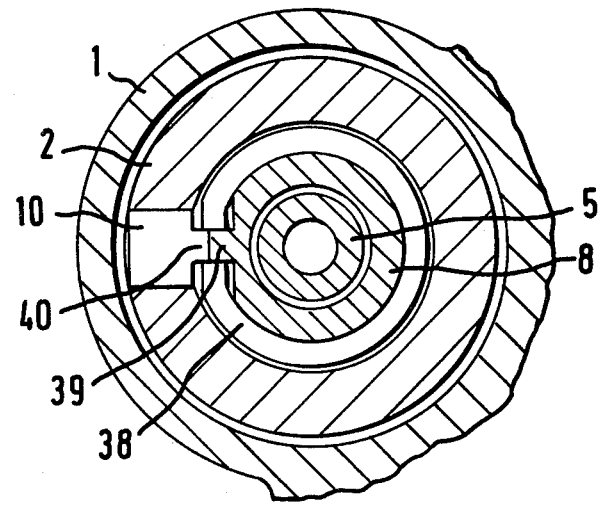
Figure 10A:
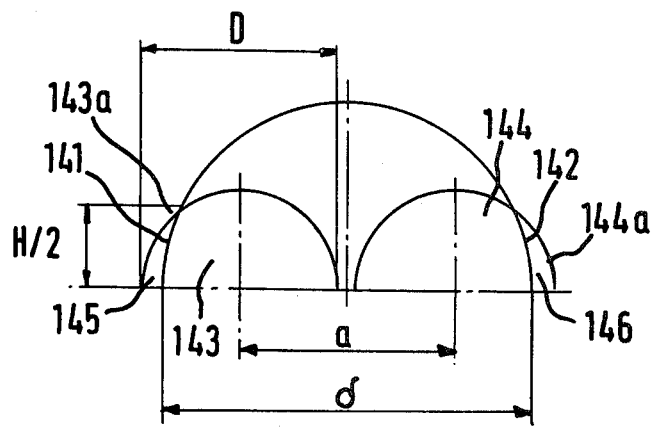
Figures 10B, 10C:
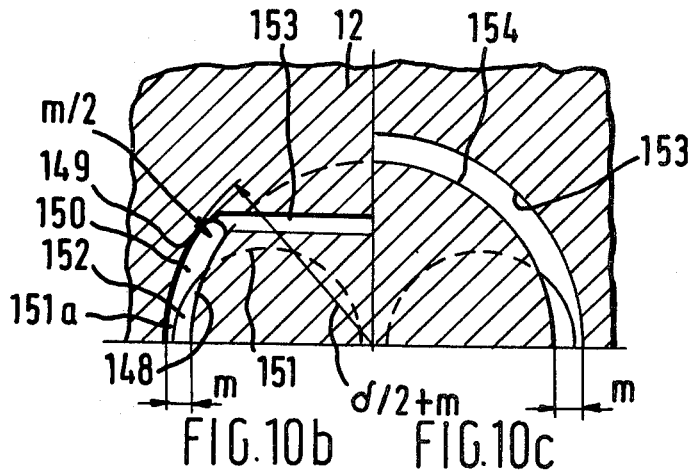
Figure 11A:
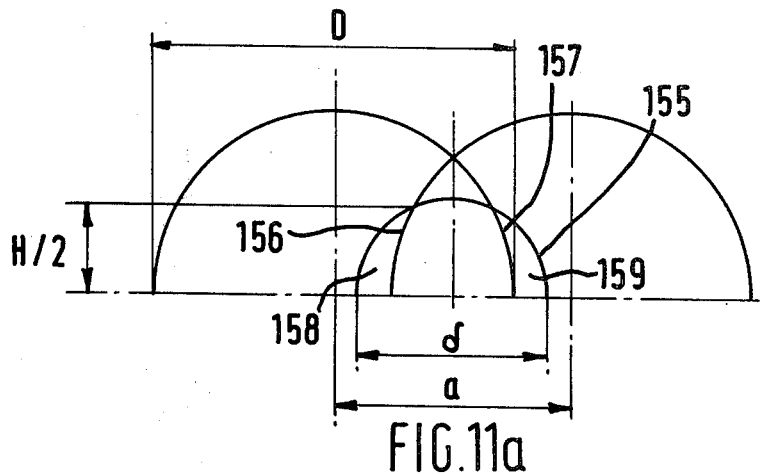
Figure 11B:
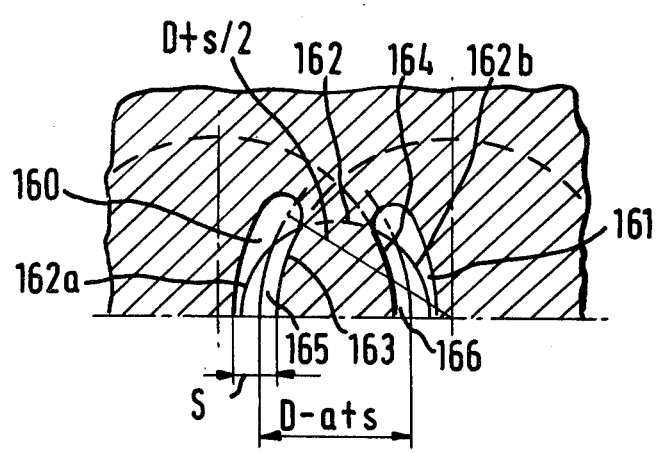
Figure 12A:
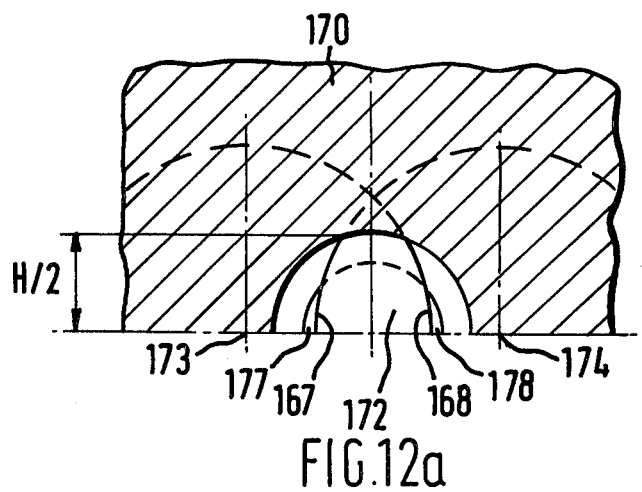
Figure 12B:
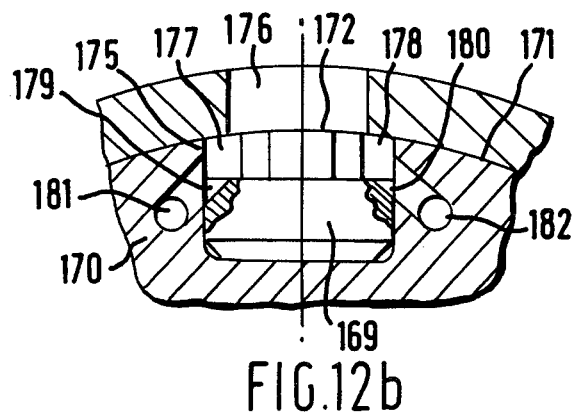

The invention is described below, by way of example, with reference to preferred embodiments illustrated in the accompanying drawings, wherein FIG. 1 is a graph illustrating the control characteristics of various control valves, wherein $g_1$ is the ideal characteristic, $g_2$ is the characteristic of control systems employing rectangular control orifices and $g_3$ and $g_4$ are characteristics of control apparatus according to the invention, FIG. 2 is a schematic diagram of apparatus consisting of a rotary piston control valve and a double-acting piston, FIGS. 3a and 3b and 4a to 4c are respective schematic views of the configurations of the control valves according to the invention, FIG. 5 is a longitudinal section of a motor vehicle steering gear provided with a control valve according to the invention, FIGS. 6 and 7 are variants of a cross-section taken on the plane A — A of FIG. 5, FIGS. 8 and 9 are cross-sections taken along the planes B — B and C — C respectively, of FIG. 5, FIG. 10a is a view to show the geometry of another variant of a control port or orifice configuration of convex-concave shape, FIGS. 10b and 10c are constructional examples according to the scheme of FIG. 10a, FIG. 11a is another geometrical illustration of a further variant of a convex-concave control port or orifice configuration, FIG. 11b is an embodiment of the geometrical solution according to FIG. 11a, FIG. 12a is a further variant to show another embodiment of the geometrical solution according to FIG. 11a, and FIG. 12b is a partial section of the embodiment shown in FIG. 12a.

FIG. 1 has already been referred to above. It has been verified by experimental results that the curve $g_1$, regarded as ideal is most closely approximated to by the curves $g_3$ to $g_4$ obtained by means of a control port configuration embodied in this invention.

FIG. 2 illustrates a control mechanism having a four-way open centre (neutral) position, together with the liquid supplying elements connected thereto and a double-acting piston. A liquid pump 201 delivers working liquid via tube 20 to a control sleeve 13. A control piston 12 is arranged in the control sleeve and is provided with ribs 205 and 206 which partially cover the liquid inlet duct 207 and liquid discharge duct 208 as a result of which respective control ports or orifices 209 and 210, 211 and 212 are formed at the liquid inlet duct 207 and the liquid discharge duct 208. The control orifices 209 and 211 on the one hand and 210 and 212 on the other hand are connected respectively by way of chambers or spaces 213 and 214; the space 213 is connected by way of duct 219 with a working space or chamber 34 in a cylinder 1 housing the double-acting piston 2, while the space or chamber 214 is connected by way of a duct 220 with the other working space or chamber 33 of the cylinder 1. FIGS. 3a and 3b show the control orifice configurations of the control mechanism according to FIG. 2 developed in the plane of the through-flow cross-section.

In each of FIGS. 3a and 3b the control orifices are formed by parts of a circular area remaining free from the partial overlap between a circular opening 121 and rib-like formations 123 and 124 on the control piston, the ribs being mutually symmetrically arranged. These Figures show the control orifices 209, 210 in their open centre position. The double headed arrow A shows the direction of the control displacement of the control mechanism; as the orifice 209 is being closed, simultaneously the through-flow cross-section of orifice 210 increases, and since the hydraulic resistance or throttling of the closing orifice 209 increases, so at the same time the hydraulic resistance or throttling of the opening orifice 210 is decreased. From FIG. 2 it can be seen that simultaneously with the closure of the orifice 209 the orifice 212 is closed to the same degree and therefore the pressure in the space 214 increases relative to the basic position while that in the space or chamber 213 is somewhat decreased. The influence of the increase of pressure in the chamber 214 depends primarily on the influence of the closure of the orifices 209 and 212. The change in pressure is little influenced by the opening of the orifice 210.

The process of closure of the circular segment-shaped orifices shown in FIGS. 3a and 3b is such that, in the case of a uniform rate of control displacement, the closure of the orifice is initially very rapid or sudden and then becomes slower. The ratio of the neutral or basic sensitivity and the final pressure sensitivity can be influenced by the choice of the inter-relation of the free-remaining through-flow cross-sectional areas and the shape of the boundary curves thereof.

In the embodiment according to FIGS. 3a and 3b the control orifices are formed by the formations or projections on the control piston as well as the control sleeve, these having circular arc-shaped boundaries. In FIG. 1 the curve $g_3$ illustrates the characteristics of the control mechanism having orifices according to FIGS. 3a and 3b. It can be seen that both the initial as well as the final pressure sensitivity is improved relative to the curve $g_2$.

The control mechanism provided with orifice configurations bounded by cylindrical surfaces can be further improved or refined by using a plurality of paralled-connected orifice groups wherein the orifice pairs in individual groups differ in magnitude or position, or in magnitude and position, from each other. This provides three additional combinational possibilities. This is illustrated in FIG. 4 for the case of a circular recess or groove and curvi-linear ribs on the control piston, for an orifice group consisting of three members. In FIG. 4a the diameters of the bores formed in the control sleeve differ; in FIG. 4b the bore diameters in the control sleeve are the same but the ribs are differently positioned and the distance between the centers of associated port pairs increases; and in FIG. 4c the bore diameters and the rib positions both change. In contrast to the embodiment of FIG. 3b, in the cases of utilizing a group of bores comprising a plurality of bores, an improved control characteristic curve results while employing an essentially identical total flow-through cross-section. The characteristic of the control valve provided with an orifice configuration according to FIG. 4a is shown in the broken line curve in FIG. 1, designated $g_4$. It can be seen that this produces a further improvement towards the ideal curve $g_1$ in relation to the curve $g_3$.

The required sensitivity to pressure starting from the center or base position can be achieved with flow through port cross-sections having overall dimensions which are greater in the direction at right angles to the direction of relative displacement between the control piston and the control sleeve than in the said direction. In the center position the length of a common cord between intersecting arcs defining each control port should be greater than, or equal to, the radius of the arcs or the smaller arc.

FIG. 5 illustrates a preferred embodiment of a servo steering control gear of a motor vehicle provided with a control mechanism according to the invention. The control mechanism is of the rotary piston type and is disposed in a working cylinder. The control orifices are circular segments in projection.

Since FIG. 2 is a schematic drawing it is not always possible to use the same designation numerals in the more detailed FIGS. 5 to 9 for corresponding system portions and components. However wherever possible the same numerals have been used.

In FIG. 5 the steering housing 1 is closed by covers 3, 4. Balls 6 axially support a steering spindle 5 in the upper cover 3. Threads on the spindle 5 mesh with a steering nut 8 via balls 7. The steering nut 8 is journalled via a ball race 9 in the piston 2 so that it can rotate about its own axis but only to a limited extent corresponding to the extent of the control movement: abutments 10 limit further rotation, in both angular senses. A rotatable piston control unit is mounted in the piston 2. An entraining member 11 connects the nut 8 with a control piston 12 in a control sleeve 13. The outer surface 14 of the control sleeve 13 fits with play/clearance in the bore 15 of the piston 2. The control sleeve 13 has grooves containing sealing rings 18, 19 adjacent to its end surfaces 16, 17. A sliding tube 20 is disposed between the steering spindle 5 and the control sleeve 13 for sealing-sliding in spindle 5, via a sealing ring 21. Teeth 22 on the piston 2 mesh with teeth 24 of a steering shaft 23 and transmit the servo force. The teeth 24 simultaneously support the piston 2 against rotation. The piston 2 has grooves containing sealing rings 25, 26. A screw 27 supports the control sleeve 13 axially in the bore 15 of the piston 2. A screw 28 in the piston 2 supports the ball race 9 of steering nut 8.

Oil enters in the bore of the upper cover 3, passes into the longitudinal bore of the steering spindle 5 and into the sliding tube 20. The oil then passes from the lower end of the tube 20 into two channels 29 (see FIGS. 5 and 6) in the control sleeve 13 which guide the oil via control slits to the outer surface of the control piston 12. Via channels 30 in the control sleeve 13 and bores 31 in the piston 2 the oil can discharge into recirculation space 32 which is always at low pressure (LP), and from there via a central bore in housing 1 to the reservoir of the pump.

The space defined by the housing 1, the piston 2 and the upper cover 3 is an upper pressure space 33 while the space defined by the housing 1, the piston 2 and the lower cover 4 is a lower pressure space 34. The upper pressure space 33 is separated from the return flow space 32 by the sealing ring 25 on the piston 2 while the return flow space 32 is separated from the lower pressure space 34 by the sealing ring 26.

A transverse bore 35 (see FIG. 6) in control piston 12 conveys oil by way of the central bore of the sleeve 13 but exterior to the tube 20 past the balls 7 and into the upper pressure space 33 while channels 36 formed in the control sleeve 13 convey it into the lower pressure space 34. The sealing ring 18 on the control sleeve 13 separates the upper pressure space 33 from an annular space 37 alongside the outer surface 14 of the control sleeve 13. The space 37 is in permanent communication with the return space 32. In this way the outer surface 14 of the sleeve 13 is not under load.

Looking at FIG. 6, when the control piston 12 turns anti-clockwise relative to the control sleeve 7, then oil flowing along channels 29 towards channels 30 leading to the lower pressure space 23 is blocked; oil flow towards the discharge channels 36 is also blocked. However, oil flow is permitted, i.e., the valve opens, towards the tube 20, and around spindle 5 to the upper pressure space 33 to displace working piston 2 downwardly, as viewed. During this movement of the working piston 2 the oil passes from space 34 via channels 36 and 30 to the low pressure return space or crank space 33 disposed around a sector gear in meshing engagement with rack teeth formed on the outer surface of the working piston 2.

When the spindle 5 is turned in the opposite angular sense, the control piston 12 rotates clockwise to block oil flow from the channel 29 towards channels 35 and 36 and opens oil flow towards channels 30, whereby the pressure oil passes to space 34 and pushes piston 2 upwardly. During this movement of the piston 2 the oil passes from space 33 around spindle 5 and via channels 35 and 36 to the space 33.

A spring 38 (see FIG. 9) maintains the control piston 12 and the nut 8 connected therewith in their basic position when the spindle 5 is not under load. The center or mean position of the control is ensured by a rib 39 on the nut 8 and a rib 40 on the abutment 10 (see FIG. 8). The ribs 39, 40 have the same width and the spring 38 engages their side surfaces. Turning the nut 8 and thus control movement of control piston 12 can only occur against deformation of the spring 38. After the end of a control or steering movement the spindle 5 is unloaded, the spring 38 returns the nut 8 to the center position and the nut 8 restores the piston 12 via the member 11.

A pin 41 in FIG. 6 secures the sleeve 13 against rotation in the piston 2. However, in the alternative arrangement of FIG. 3 adjustment of the relative angular position of sleeve 13 and piston 12 is possible. To this end, screws 42 in the piston 2 bear on surfaces 43 formed on the sleeve 13, to allow continuous rotary adjustment of the sleeve 13 relative to the piston 12, whereby to enable the center or neutral position of the steering to be adjusted, and fixed in that position by tightening the screws 42.

FIG. 10 a illustrates a geometrical solution according to the invention for arranging the configuration of the control orifices of the control sleeve 13 and the control piston 12 whereby they are bounded by pure right circular cylindrical surfaces, this being one case of the variant according to FIG. 3b. In FIG. 10a certain dimensions are shown and referred to by letters and the dimensions in question are related by the inequality formula shown. Accordingly, on one control element there is a single cylindrical surface with a radius of curvature $\delta/2$ on which one can form two convex orifice-bounding surfaces 141 and 142 which surfaces delimit the control orifices 145 and 146 with the concave sides 143a and 144a of the control bores 143 and 144 formed on the other control element.

FIG. 10b shows a practical embodiment of the control mechanism the geometrical configuration of which was shown in FIG. 10a. On one control element, expediently in the piston 12 a groove 150 is formed with a radius of curvature of $\delta/2$ by two concentric cylindrical surfaces 148 and 149 spaced by a distance m and terminating in a rounded-off surface having a radius of curvature $m/2$. The convex side 151a of a bore 151 formed in the other control element defines a control orifice 152 with the concave side 149 of the groove 150. Expediently, the bore 151 is in the control sleeve 13. A connecting bore 153 is provided for connecting the groove 150 with its non-illustrated but symmetrically disposed other side, to allow the hydraulic medium to be transferred. In the variant of FIG. 10c the groove sides 153 and 154 are completely annular and the groove width m is greater than the maximum width of the control orifice which can be expressed as $(a + D - \delta)/2$.

Referring now to FIG. 11a there is shown a configuration of control port or orifice configuration according to the invention to illustrate another variant wherein the orifices are bounded by pure circular cylinder surfaces. This variant is also a special case of that shown in FIG. 3b. Various dimensions are denoted by reference letters as shown, and these dimensions are related by the inequality shown in the caption of FIG. 11a. Accordingly, on one of the control elements a single cylindrical bore 155 of diameter $\delta$ cooperates with two cylindrical surfaces 156, 157 formed on the other control element to define two control orifices 158 and 159. The centres of the cylindrical surfaces 156, 157 are spaced by the distance a and the control orifice 158 is defined by the concave part of the bore 155 and the convex part of the cylindrical surface 156; while, on the other hand, the control orifice 159 is defined between the convex cylindrical surface 157 and the concave part of the bore 155.

FIG. 11b shows a practical embodiment of the geometrical arrangement shown in FIG. 11a showing two channels 150, 151 which are not connected with each other but which are respectively connected by non-illustrated means with separate working spaces or chambers. The central axes of symmetry of the two channels 160, 161 are spaced from each other in the central plane by a distance $D - a + s$ where D and a have the significance shown in FIG. 8 and s is the width of each channel 160, 161. Their radius of curvature is $(D + s)/2$.

On the other non-illustrated, control element there is formed a control bore 162. The concave walls or faces of the bore 162, namely the portion designated 162a and 162b define control orifices 165 and 166 with the convex walls or surfaces 163, 164 of the channels 160, 161 respectively.

The constructional variant according to FIGS. 12a and 12b also corresponds to the geometrical arrangement of FIG. 11a. The illustrated cylindrical surface portions 167 and 168 are not coaxial and the control ports or orifices 177, 178 are defined between them and the corresponding cylindrical surfaces of the other control element. An independent or separate bolt 169 is provided in the piston 170 with an end face having a curvature identical to the curvature of the piston face 171, the bolt end face being designated by 172. The biconvex cylindrical surfaces 167 and 168 are then made by a tool with free running out between the axes 173 and 174 from the end 172 and in the finished condition expediently the bolt is fixed in a radial bore 175 formed in the piston 170 so that the cylindrical surfaces 171 on the piston and 172 on the bolt should coincide. This may expediently be done by a single surface machining after press fittings. The diameter D (see FIG. 11a) of the bolt 169 is smaller than the chord H of the cylindrical surfaces 167, 168 but is greater than the diameter $\delta$ of the control bore 176 formed on the non-illustrated cooperating control element. The control spaces 177, 178 are connected by respective channels 179 and 180 with bores 181, 182 leading to separate and non-illustrated working spaces.

We claim as our invention:

1. Hydraulic port control apparatus for approximating more closely to pressure regulation proportional to displacement, for use with hydraulic devices of the reciprocating, double-acting type such as servo steering gear of motor-vehicles, said control apparatus comprising a control mechanism including a control sleeve and a coaxial, cylindrical control piston, a control signal-generating element connected for movement transmission to one of said control sleeve and said control piston, while the other of said control sleeve and control piston being prevented from displacement in the direction of the control movement, pressure chambers, working fluid channels and working fluid inlets and outlets defined in the said apparatus and connected to the control mechanism as well as to the pressure chambers, and control ports defined between cooperating openings and projections formed on the control piston and the control sleeve, wherein the control ports are so arranged in pairs that as one is opened the other is closed and vice versa, there is an open center position in which both ports of each pair are open to the same extent, the sectional configuration of each control port in a direction perpendicular to the direction of flow through is defined by two intersecting circular arcs having a common cord of maximum length H in the said open center position, the diameter of the arcs if all the arcs are the same diameter or the smaller arc if the arcs are of different diameters is D, and $H \geqq D/2$.

2. Apparatus according to claim 1 wherein the common chord of the circular arcs is perpendicular to the direction of the control displacement.

3. Apparatus according to claim 1 wherein the control piston is a rotary piston, and the control ports are defined by radial bores formed on one of said control piston and control sleeve and curvilinear ribs on the other of said control piston and control sleeve.

4. Apparatus according to claim 3 wherein the said radial bores are of mutually different radii and of greater width than the maximum width of said ribs, and in the open centre position of the apparatus the centre of each bore coincides with the centre line of the cooperating rib.

5. Apparatus according to claim 3 wherein the said radial bores are of the same radius, but the spacing between the centre points of associated bore pairs varies and is smaller than the maximum width of the cooperating ribs, and in the open centre position of the apparatus the centre line of each rib coincides with the bisection of said spacing of the cooperating bore pair.

6. Apparatus according to claim 3 wherein the said radial bores are of unequal radii, the spacing between the centre points of associated bore pairs varies and said ribs are of unequal maximum width, the said spacing being smaller than the maximum width of the cooperating ribs, and in the open centre position of the apparatus the centre line of each rib coincides with the bisection of said spacing of the cooperating bore pair.

7. Apparatus according to claim 1 wherein the control ports are each defined by a radial bore in one of said control piston and control sleeve encompassed by two radial bores formed in the other of said control piston and control sleeve, the distance between the axis of the two bores in said one control element being smaller than the sum of the diameters of the said two bores, in the centre position of control the centre line of the bore of said other control element bisects the said distance between the axes, and in the case of rotary control all three bores are arranged in the same plane at right angles to the axis of rotation while in the case of a control mechanism of the axial displacement type, all three bores are arranged in the same plane at right angles to the direction of control displacement.

8. Apparatus according to claim 1 wherein the control ports are defined by sections of two cylindrical surfaces on one of said control piston and control sleeve, and sections of a bore formed in the other of said control piston and control sleeve, the distance between the axes of said surfaces being greater than their diameter but smaller than the diameter of the bore formed on said other control element.

9. Apparatus according to claim 1 wherein the control ports are defined by sections of two cylindrical surfaces on one of said control piston and control sleeve, and sections of a bore formed in the other of said control piston and control sleeve, the distance between the axes of said surfaces being smaller than their diameter but greater than the diameter of the bore formed on the said other control element.

10. Apparatus according to claim 1 wherein in one of said control piston and control sleeve there is fitted radially and secured a bolt having a cylindrical portion and an end portion with an outer surface defined by two longitudinal cylindrical surfaces which if projected would intersect each other at opposite ends of a chord which is longer than the diameter of the cylindrical portion, the distance between the axes of said surfaces being greater than the diameter of the cylindrical portion, while the transverse end surface of the end portion is a cylindrical surface of a curvature with a radius equal to that of the curvature of the piston, and the bolt being fitted into the said one control element so as to render the said chord perpendicular to the direction of control displacement.

11. Apparatus according to claim 9 wherein in one of said control piston and control sleeve there is fitted radially and secured a cylindrical bolt having an outer surface defined by two cylindrical surfaces which intersect each other in a chord longer than the diameter of the bolt, the distance between the axes of said surfaces being greater than the diameter of the bolt, while the end surface thereof is a cylindrical surface of a curvature with a radius equal to that of the curvature of the piston, and the bolt being fitted into the said one control element so as to render the chord perpendicular to the direction of control displacement.

12. Apparatus according to claim 1 wherein a plurality of control ports are connected hydraulically in parallel and at least two of said ports differ in one of the following, namely cross-sectional areas, and boundary curve curvature.

* * * * *

UNITED STATES PATENT AND TRADEMARK OFFICE
CERTIFICATE OF CORRECTION

PATENT NO. : 4,143,676
DATED : March 13, 1979
INVENTOR(S) : JÓZSEF IVONY, IMRE LENDVAI, LÁSZLÓ SZÜCS and LÁSZLÓ SZÉKELY It is certified that error appears in the above–identified patent and that said Letters Patent are hereby corrected as shown below:

In [76] Inventors, line 2, delete "U 50" insert --u.50--.

In [76] Inventors, line 3, delete "Bathyány U. 14" insert --Batthyány u.14--.

Column 2, line 35, delete "tan $\alpha_2$ = 1." insert --tan $\alpha_1$ = 1.--.

Column 9, line 19, delete "a" insert --$\underline{a}$--.

Column 9, line 31, delete "a" insert --$\underline{a}$--.

Column 9, line 32, delete "s" insert --$\underline{s}$--.

Column 10, line 64, delete "axis" insert --axes--.

Signed and Sealed this

Twenty-fifth Day of September 1979

[SEAL]

Attest:

LUTRELLE F. PARKER
*Attesting Officer*     *Acting Commissioner of Patents and Trademarks*